United States Patent [19]
Smith

[11] Patent Number: 6,123,165
[45] Date of Patent: Sep. 26, 2000

[54] MOTORCYCLE SWING ARM ADJUSTER

[75] Inventor: Donald Jerry Smith, Brooklyn Park, Minn.

[73] Assignee: Chrome Specialties, Inc., Fort Worth, Tex.

[21] Appl. No.: 09/209,595

[22] Filed: Dec. 11, 1998

[51] Int. Cl.[7] .................................................. B62D 61/02
[52] U.S. Cl. ........................................ 180/227; 280/284
[58] Field of Search .................................. 180/219, 227; 280/283, 284, 285, 286

[56] References Cited

U.S. PATENT DOCUMENTS

| | | | |
|---|---|---|---|
| 5,816,356 | 10/1998 | Jansson et al. | 180/227 |
| 5,996,718 | 12/1999 | Desrosiers | 180/227 |
| 6,003,628 | 12/1999 | Jurrens et al. | 180/227 |

Primary Examiner—Kevin Hurley
Attorney, Agent, or Firm—Max Ciccarelli; Thompson & Knight

[57] ABSTRACT

In a Softail®-type motorcycle frame, a rear damper mounting bracket is connected to a threaded receiver, which is in turn connected to an adjuster plate. The adjuster plate has two longitudinal slots for fastening the adjuster plate to the swing arm lower cross member. An adjuster bracket is also connected to the swing arm lower cross member. An adjuster bolt is located through a hole in the adjuster bracket and threaded into the threaded receiver. An adjuster lock-down nut and fasteners through the adjuster plate slots keep the adjuster plate in the selected position. The dampers are connected to the rear damper mounting bracket by conventional means. By selectively threading the adjuster bolt into or out of the threaded receiver, the ride height of the motorcycle frame can be carefully controlled. Also, the alignment between the main frame and the swing arm can be carefully adjusted.

2 Claims, 2 Drawing Sheets

MOTORCYCLE SWING ARM ADJUSTER

BACKGROUND OF THE INVENTION

1. Field of the Invention

This invention relates in general to motorcycle frames, and in particular to an swing arm adjuster mechanism for adjusting the position of the swing arm relative to the main frame.

2. Description of the Prior Art

Motorcycle frames of the Harley-Davidson Softail® type are characterized by a main frame and a rear frame (often referred to as a swing arm) which is pivotally and dampedly attached to the main frame. A representative example of a Harley-Davidson Softail® frame is shown in U.S. Pat. No. 4,022,484. Many variations of this type of frame exist, some made by Harley-Davidson, some by others.

Because of the pivotal connection between the main frame and the swing arm, an adjuster is usually desirable to adjust the riding height of the motorcycle. Prior art devises exist, but are cumbersome to accurately adjust.

Also, with the new motorcycle frame recently introduced by Chrome Specialties, in which the main frame rail members (the main contour members of U.S. Pat. No. 4,022,484) are located inwardly of the longitudinal frame members and the ends of the lower longitudinal frame members and the ends of the swing arm lower side members come into close proximity to each other to simulate the look of a rigid frame, a precise swing arm adjuster mechanism is in high demand.

SUMMARY OF THE INVENTION

It is the general objective of the invention to provide an improved swing arm adjuster mechanism.

It is another objective of the invention to provide an improved swing arm adjuster mechanism that is easy to adjust accurately.

The above as well as additional objectives are achieved as is now described. A rear damper mounting bracket is connected to a threaded receiver, which is in turn connected to an adjuster plate. The adjuster plate has two longitudinal slots for fastening the adjuster plate to the swing arm lower cross member. An adjuster bracket is also connected to the swing arm lower cross member. An adjuster bolt is located through a hole in the adjuster bracket and threaded into the threaded receiver. An adjuster lock-down nut and fasteners through the adjuster plate slots keep the adjuster plate in the selected position. The dampers are connected to the rear damper mounting bracket by conventional means. By selectively threading the adjuster bolt into or out of the threaded receiver, the ride height of the motorcycle frame can be carefully controlled. Also, the alignment between the main frame and the swing arm can be carefully adjusted.

The above as well as additional objectives, features, and advantages will become apparent in the following description.

DETAILED DESCRIPTION OF THE PREFERRED EMBODIMENT

Figure 1:
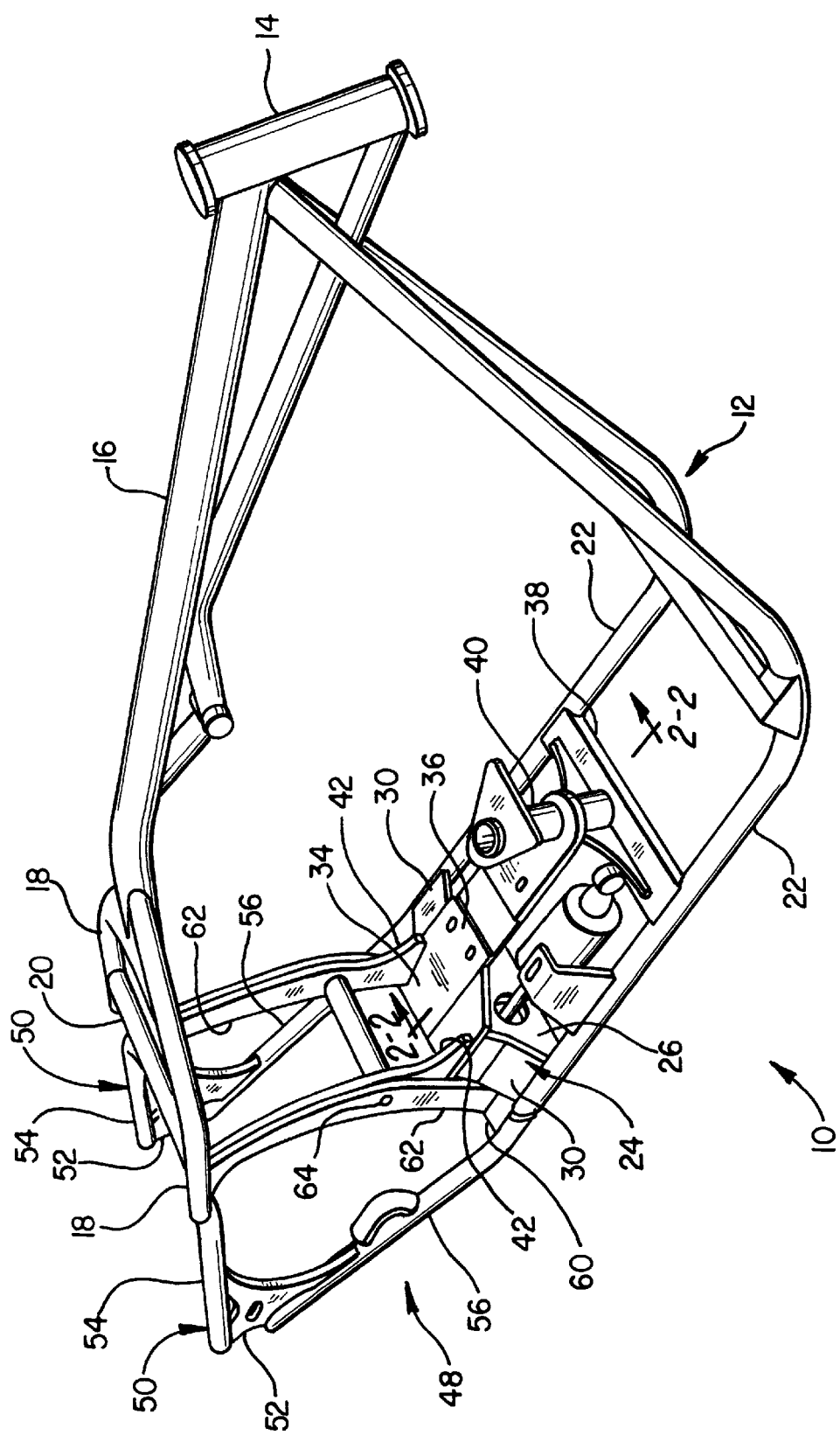
FIG. 1 is a perspective view of a Softail®-type motorcycle frame with on which has been mounted (although not visible in this Figure) the swing arm adjuster of the present invention.

FIG. 1 depicts a motorcycle frame of the type having a main frame and a swing arm pivotally connected thereto. These frames are often referred to as Softail®-type frames. The particular frame depicted in FIG. 1 is a frame recently introduced by Chrome Specialties, of Fort Worth, Tex. Although this frame is significantly different from the conventional Softail®-type frames, those skilled in the art will realize that the present invention can be easily adapted to any of the Softail®-type motorcycle frames.

Referring to FIG. 1, main frame 10 has a main upper longitudinal member 16 that extends rearward from the vertical steering assembly member 14. The rear end portion of the main upper longitudinal member 16 is connected to the secondary upper longitudinal members 18. An upper frame cross member 20 extends between the two secondary upper longitudinal members 18. Lower longitudinal members 22 extend rearward from the front of the frame.

A truss assembly 24 (or first lower frame cross member 24) connects the rear end portions of the lower longitudinal members to each other. Truss assembly 24 comprises front truss wall 26, rear truss wall 28, side truss walls 30, bottom truss wall 32, and upper truss wall 34. Side truss walls 30 are angled inward and upward, resulting in upper truss wall 34 being narrower than bottom truss wall 32 and narrower than the distance between lower longitudinal members 22. Upper truss wall 34 extends forward to form the transmission mounting plate 36. Extending from the upper truss wall 34 to the upper frame cross member 20, and at a position inward of lower longitudinal members 22 and secondary upper longitudinal members 18, are main contoured members 42.

Referring again to FIG. 1, a second lower frame cross member 38 connects the lower longitudinal members to each other at a point forward of truss assembly 24. A vertical engine mounting member 40 protrudes upwardly from the second lower frame cross member 38. Transmission mounting plate 36 connects vertical engine mounting member 40 to truss assembly 24.

Referring still to FIG. 1, the swing arm 48 (or rear frame 48) is depicted. Left and right V-shaped members 50 comprise rear axle attachment lugs 52, swing arm lower side members 56, and swing arm upper side members 54. Rear axle attachment lugs 52 allow for attachment of swing arm 48 to the rear axle (not shown) along the rear axle axis. Upper and lower swing arm cross members 58, 60 connect the left and right V-shaped members 54 to each other.

Swing arm contoured members 62 (or side plates 62) are connected between the upper and lower swing arm cross members 58, 60. Swing arm contoured members 62 are located inward of V-shaped members 50 but outward of main contoured members 42. Swing arm frame attachment pivot 64 pivotally connects swing arm 48 to main frame 10.

Swing arm contoured members 62 and main contoured members 42 are connected so that when swing arm 48 is pivotally connected to main frame 12 the left swing arm contoured member 62 is adjacent the left main contoured member 42 and the right swing arm contoured member 62 is adjacent the right main contoured member 42. Also, the swing arm contoured members 62 and the main contoured members 42 are connected so that the drive belt, chain, or other drive member (not shown) travels outward of swing arm contoured members 62 and the main contoured members 42.

The swing arm adjuster mechanism of this invention will now be described with respect to the above-described frame.

However, those skilled in the art will readily appreciate that the invention can be adapted to be used with a variety of Softail®-type frames.

Figure 2:
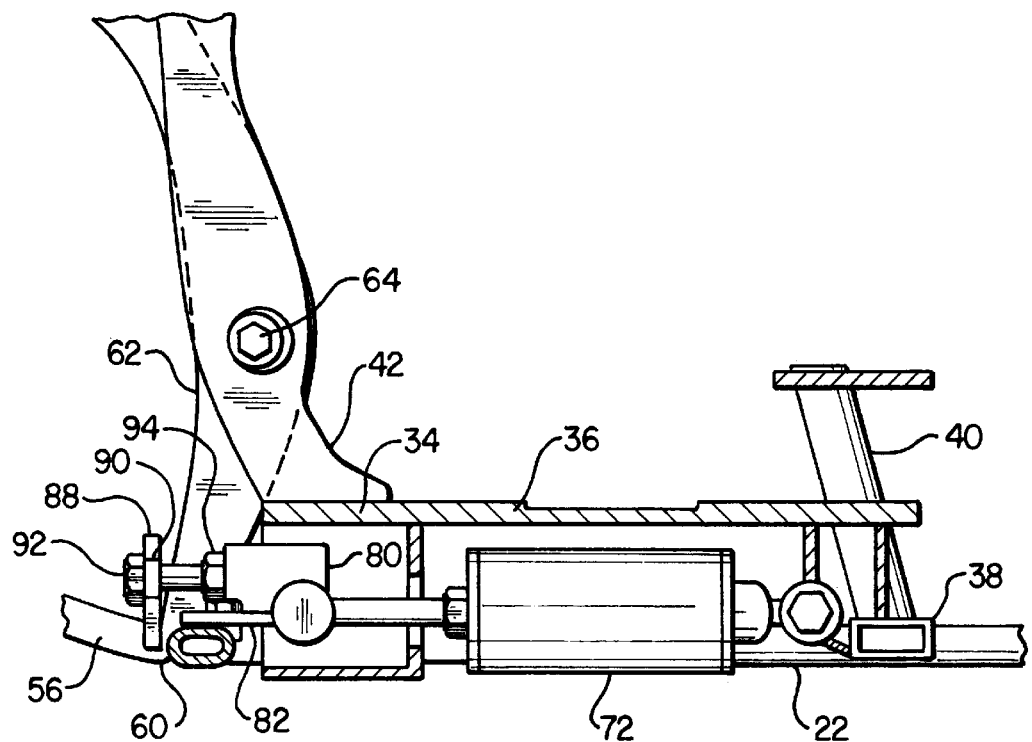
FIG. 2 is a vertical cross sectional view of the motorcycle frame of FIG. 1, taken along line 2—2 of FIG. 1.
Figure 3:
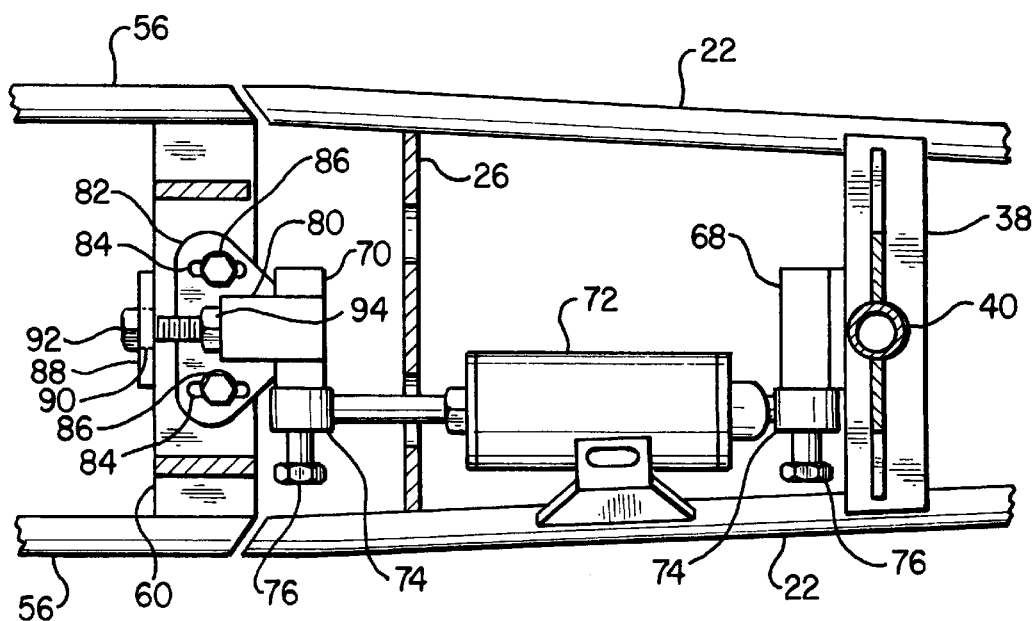
FIG. 3 is a horizontal cross section taken just below the transmission mounting plate of the frame of FIG. 1.

Referring now to FIGS. 2 and 3, the swing arm adjuster of the present invention is depicted. A front damper mounting bracket 68 is connected to the second lower frame cross member 38 and to the underneath of transmission mounting plate 36. A rear damper mounting bracket 70 is connected to a threaded receiver 80. Damper 72, having damper coupling sleeves 74 is connected by means of damper fasteners 76 to front damper mounting bracket 68 and rear damper mounting bracket 70. For purposes of simplicity, FIG. 3 shows only one damper 72, however, those skilled in the art will readily appreciate that two dampers 72 are used, one on each side of the damper mounting brackets 68, 70.

Threaded receiver 80 is connected to adjuster plate 82. Adjuster plate 82 has two longitudinal slots 84 for fastening the adjuster plate 82 to the swing arm lower cross member 60 with fasteners 86. An adjuster bracket 88 is connected to the swing arm lower cross member 60. An adjuster fastener or bolt 92 is located through a hole 90 in the adjuster bracket 88 and threaded into the threaded receiver 80. By selectively threading the adjuster bolt 92 into or out of the threaded receiver 80, the rearward and forward movement of the rear damper mounting bracket 70 can be carefully controlled. An adjuster lock-down nut 94 and fasteners 86 keep the adjuster plate 82 in the selected position.

By threading adjuster bolt 92 further into threaded receiver 80, the lower portion of swing arm 48 (namely, swing arm lower cross member 60) is pulled closer to the rear end of lower longitudinal members 22, thus resulting in raising the ride height of the frame. By threading adjuster bolt 92 out of threaded receiver 80, the opposite effect is achieved and the right height is lowered. The adjuster mechanism of this invention is particularly suited to accurately adjusting the steady state relative position between the main frame 12 and swing arm 48 so that the rear ends of lower longitudinal members 22 closely coincide with the forward ends of swing arm lower side member 56.

Another advantage of the swing arm adjuster of this invention is that only one adjuster mechanism, adjuster bolt 92, is used to adjust the connections to both dampers 72. In prior art swing arm adjusters, the connection to each damper 72 had to be adjusted separately, requiring additional labor and sometimes resulting in an inaccurate setting.

While the invention has been particularly shown and described with reference to a preferred embodiment, it will be understood by those skilled in the art that various changes in form and detail may be made therein without departing from the spirit and scope of the invention.

What is claimed is:

1. A motorcycle swing arm adjuster mechanism comprising:

an adjuster bracket adapted for connection to a swing arm lower cross member, the adjuster bracket having a hole extending longitudinally therethrough;

an adjuster plate having a plurality of longitudinal slots extending therethrough, the adjuster plate being selectively fastenable to the swing arm cross member with fasteners extending through the longitudinal slots;

a threaded receiver longitudinally connected to the adjuster plate;

an adjuster fastener located through the hole in the adjuster bracket and threaded into the threaded receiver, the adjuster fastener having a lock-down nut disposed about the fastener between the adjuster bracket and the threaded receiver; and a damper mounting bracket connected to the threaded receiver and adapted for connection to a damper.

2. A motorcycle frame comprising:

a main frame, comprising a steering assembly member, a plurality of lower longitudinal members and at least one upper longitudinal member connected to and extending rearward from said steering assembly member, main contoured members extending between the upper longitudinal member and the lower longitudinal members;

a swing arm frame portion, comprising a plurality of longitudinal members coupled at one end thereof, a plurality of rear contoured members disposed between said longitudinal members, and a swing arm lower horizontal cross member extending between said longitudinal members, said swing arm frame portion being pivotally mounted to said main frame;

an adjuster bracket connected to the swing arm lower horizontal cross member, the adjuster bracket having a hole extending longitudinally therethrough;

an adjuster plate having a plurality of longitudinal slots extending therethrough, the adjuster plate being selectively fastenable to the swing arm lower horizontal cross member with fasteners extending through the longitudinal slots;

a threaded receiver longitudinally connected to the adjuster plate;

an adjuster fastener located through the hole in the adjuster bracket and threaded into the threaded receiver, the adjuster fastener having a lock-down nut disposed about the fastener between the adjuster bracket and the threaded receiver; and a damper mounting bracket connected to the threaded receiver and adapted for connection to a damper.

* * * * *